(12) United States Patent
De' Longhi

(10) Patent No.: US 11,045,044 B2
(45) Date of Patent: Jun. 29, 2021

(54) COOKING MACHINE

(71) Applicant: De' Longhi Appliances S.R.L., Treviso (IT)

(72) Inventor: Giuseppe De' Longhi, Treviso (IT)

(73) Assignee: DE' LONGHI APPLIANCES S.R.L., Treviso (IT)

( * ) Notice: Subject to any disclaimer, the term of this patent is extended or adjusted under 35 U.S.C. 154(b) by 52 days.

(21) Appl. No.: 14/781,886

(22) PCT Filed: Apr. 23, 2014

(86) PCT No.: PCT/IB2014/060949
§ 371 (c)(1),
(2) Date: Oct. 1, 2015

(87) PCT Pub. No.: WO2014/174466
PCT Pub. Date: Oct. 30, 2014

(65) Prior Publication Data
US 2016/0051086 A1    Feb. 25, 2016

(30) Foreign Application Priority Data
Apr. 24, 2013   (IT) .............................. MI2013A0687

(51) Int. Cl.
*A47J 37/06*    (2006.01)

(52) U.S. Cl.
CPC ........... *A47J 37/06* (2013.01); *A47J 37/0641* (2013.01)

(58) Field of Classification Search
CPC .... A47J 37/06; A47J 37/0641; A47J 37/0623; F24C 15/006; F24C 15/325; F24C 7/10
(Continued)

(56) References Cited

U.S. PATENT DOCUMENTS

| | | | | |
|---|---|---|---|---|
| 4,107,501 A | * | 8/1978 | Ironfield | H05B 6/6402 |
| | | | | 219/710 |
| 4,403,128 A | * | 9/1983 | Takagi | H05B 6/642 |
| | | | | 126/21 A |

(Continued)

FOREIGN PATENT DOCUMENTS

| EP | 2292128 A1 | 9/2011 |
|---|---|---|
| WO | 94-23627 A2 | 10/1994 |

OTHER PUBLICATIONS

PCT/IB2014/064072, International Searching Authority—European Patent Office, International Search Report, dated Dec. 22, 2014.

(Continued)

*Primary Examiner* — Tu B Hoang
*Assistant Examiner* — Vy T Nguyen
(74) *Attorney, Agent, or Firm* — Ice Miller LLP

(57) ABSTRACT

Cooking machine of the type comprising an internal casing (2), within which a container (3) for food to be cooked is housed and a source of hot air that can be conveyed in the direction of the food, such casing being closed on the upper side by a lid (5). Means (7), associated with such lid are provided for generating a hot air flow in the direction of the food arranged in the container (3). Such generation means comprise an upper heating element (71), a fan (72) adapted to generate a flow of air heated by the heating element. Outside the heating element and fan an air conveying duct (74) is present, which is adapted to direct hot air flow in a direction substantially perpendicular to the plane on which the food lies in the container (3).

7 Claims, 3 Drawing Sheets

(58) Field of Classification Search
USPC ....... 219/400, 411, 385, 395, 398, 402, 428,
219/434, 494; 126/21 A, 21 R; 99/476,
99/325, 447, 448, 339, 340, 380, 385,
99/403, 413, 422, 427, 440, 446, 450,
99/451, 474; 29/592.1, 700, 890.03;
392/416, 408, 347, 411, 418, 425
See application file for complete search history.

(56) References Cited

U.S. PATENT DOCUMENTS

| | | | |
|---|---|---|---|
| 5,165,328 A | 11/1992 | Erickson et al. | |
| 5,466,912 A * | 11/1995 | Dornbush | A47J 36/12 126/21 A |
| 5,590,583 A * | 1/1997 | Harrison | A47J 37/0623 126/21 A |
| 6,201,217 B1 * | 3/2001 | Moon | A47J 37/0623 126/21 A |
| 6,747,250 B1 | 6/2004 | Cha | |
| 8,835,810 B2 * | 9/2014 | Moon | F26B 9/003 219/386 |
| 2004/0035845 A1 | 2/2004 | Moon et al. | |
| 2005/0223906 A1 * | 10/2005 | Xu | A47J 27/004 99/348 |
| 2015/0122136 A1 * | 5/2015 | Chen | A47J 37/047 99/427 |

OTHER PUBLICATIONS

PCT/IB2014/064072, International Searching Authority—European Patent Office, Written Opinion, dated Dec. 22, 2014.
International Center for Patent Registration, Ministry of Economy, Examination Report, Effective Date Oct. 16, 2020, 5 pages, United Arab Emirates.
International Center for Patent Registration, Ministry of Economy, Search Report, Effective Date Oct. 16, 2020, 5 pages, United Arab Emirates.

* cited by examiner

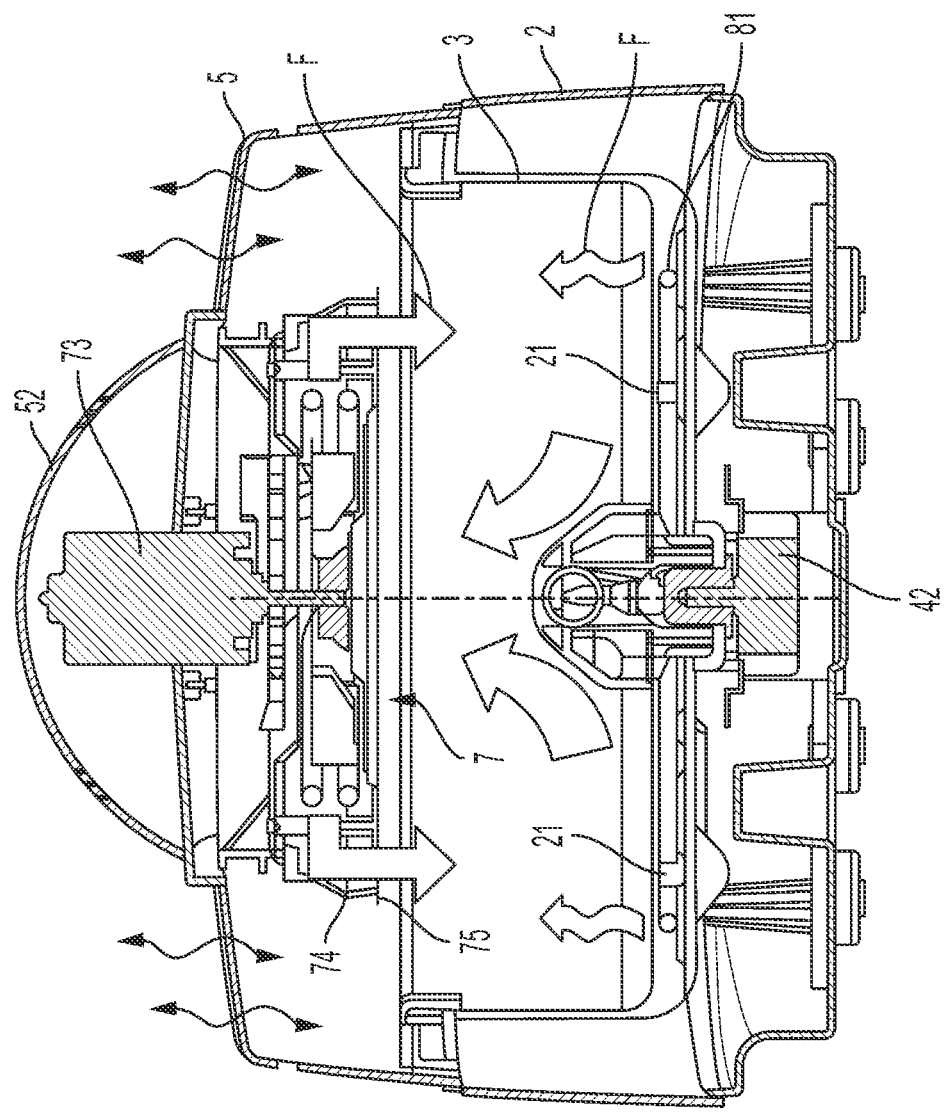

COOKING MACHINE

CROSS-REFERENCE TO RELATED APPLICATIONS

The present application is related to and claims the priority benefit of International Patent Application Serial No. PCT/IB2014/060949, filed Apr. 23, 2014 and Italian Patent Application Serial No. MI2013A 000687, filed Apr. 24, 2013, the text and drawings of which are hereby incorporated by reference in their entireties.

The present invention refers to a cooking machine.

In particular, the present invention refers to a cooking machine of the type comprising an external casing, within which a container for the food to be cooked is housed and a source of hot air that can be conveyed in the direction of said food.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

(1) Field of the Invention

Such types of machines are usually portable, i.e. they are small and they are at times referred to as fryers, small ovens or the like.

(2) Description of Related Art Including Information Disclosed Under 37 CFR 1.97 and 1.98

In the state of the art, cooking machines of such type are known which, when used as fryers, require oil or fat or equivalent substances which assist the cooking, at relatively small amounts. For this reason, they are usually referred to as "dry fryers".

In particular, patent EP1781154 describes a fryer of such type, in which the food is contained in a container arranged in the casing and in which a particular conveyance of the hot air allows the cooking thereof, in the presence of limited amount of oil. In particular, the hot air is blown into the container by heating means adapted to generate a hot air flow.

The entry of hot air into the container of the food occurs from the top and from one side of the container, while the exit thereof occurs from underneath. A screen for deflecting the generated hot air flow, determines such path of hot air and the presence of an annular channel, obtained between the container and the casing, causes the exit of the air from the bottom.

In addition, such machine comprises means for mixing the food positioned in the container and mobile with respect thereto and a housing or vat for fat matter, distinct from said container but connected thereto, so as to be able to transfer such matter on food during the cooking.

In addition, small portable ovens for cooking food analogously are known, comprising a casing within which a container/basket on which a heat generation source is present, arranged above and beneath the basket, transmits the heat thereof.

The Applicant observed that the configuration of the fryer of patent EP1781154 results in the spreading of hot air substantially tangentially to the food.

Actually, the heat is distributed starting from an emission port arranged in a non-central point of the container of the food.

Thus, the distributor determines a path for distribution towards the food, which is almost always tangential to the same, as easily observable in FIG. 2 of such patent.

In addition, in order to obtain the effective circulation of air, the return air which should once again be heated by heater means, exits from the container and traverses an annular channel obtained between the container and the casing. In order to make the exit of air efficient, such annular channel must be conveniently delimited.

BRIEF SUMMARY OF THE INVENTION

The present invention aims at overcoming the aforementioned drawbacks by providing a cooking machine food, of the type conventionally indicated for substantially cooking without oil, in which the distribution of hot air on the container of the food is further optimised.

An aspect of the present invention regards a machine for cooking food having the characteristics of the attached claim 1.

BRIEF DESCRIPTION OF THE SEVERAL VIEWS OF THE DRAWINGS

The characteristics and advantages of the machine according to the present invention shall be clearer and more apparent from the following exemplifying and non-limiting example of an embodiment provided with reference to the attached figures which respectively illustrate:

FIG. 5 a sectional view of the machine according to the present invention, particularly with the hot air flow lines outlined.

DETAILED DESCRIPTION OF THE INVENTION

Figure 1:
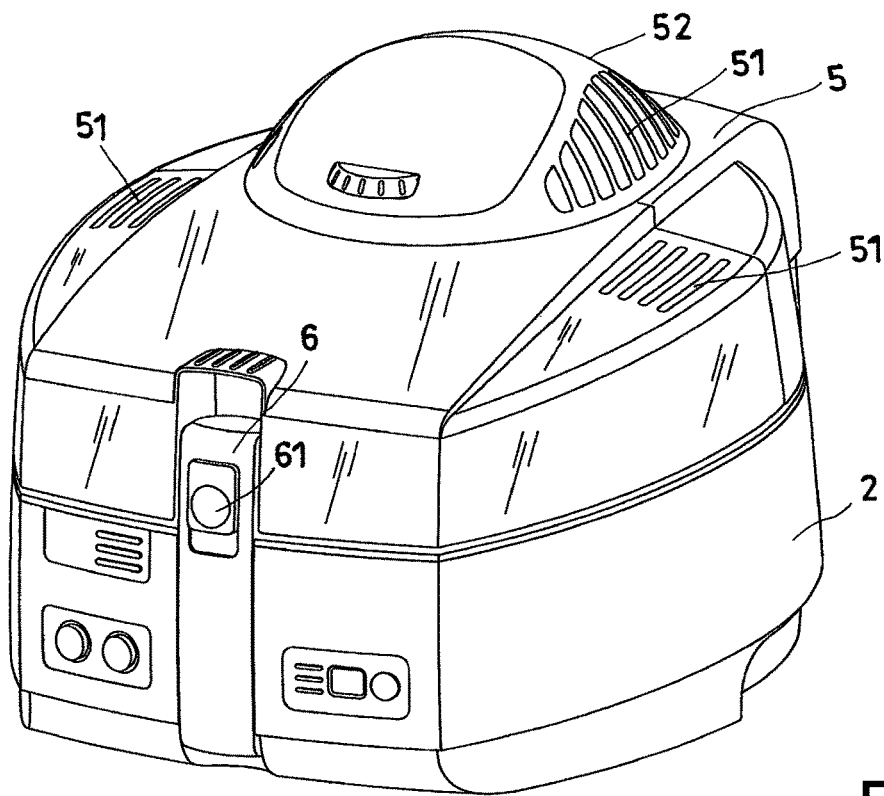
FIG. 1 a perspective view of the machine in its entirety according to the present invention.
Figure 2:
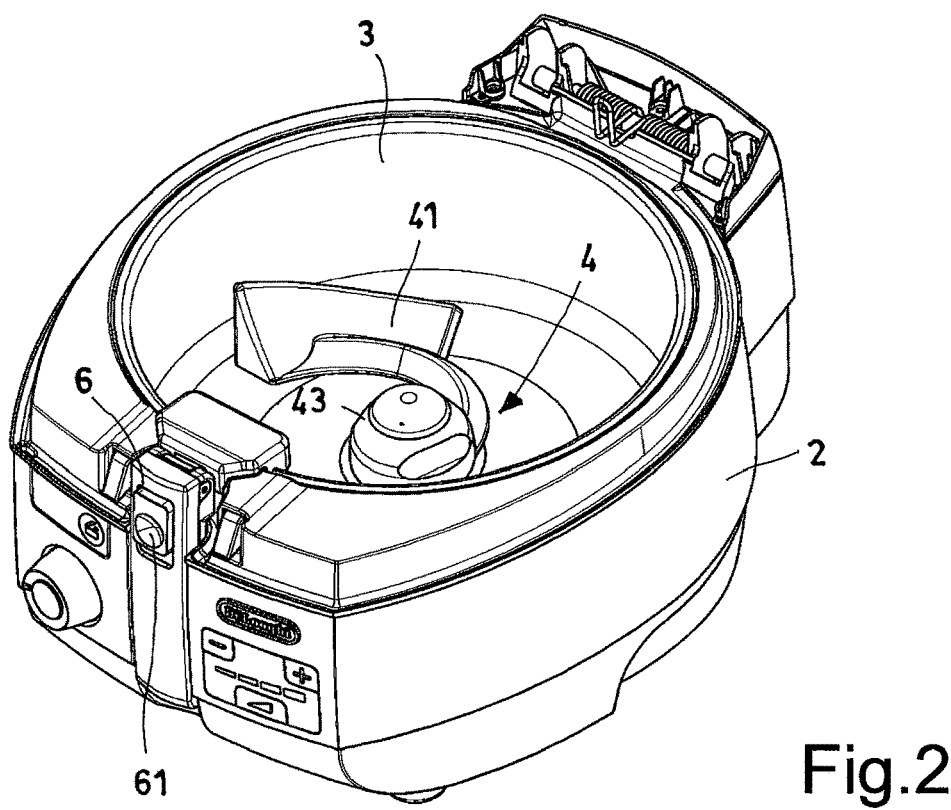
FIG. 2 a perspective view of the machine in its entirety without lid according to the present invention.
Figure 3:
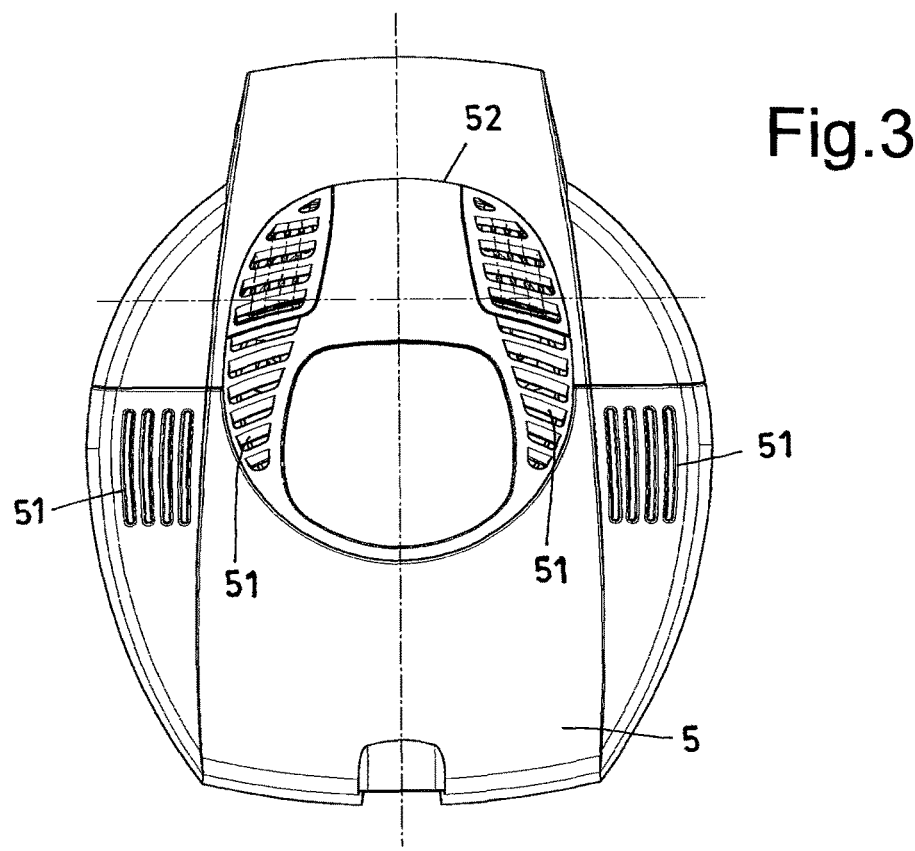
FIG. 3 a top view of the machine according to the present invention.
Figure 4:
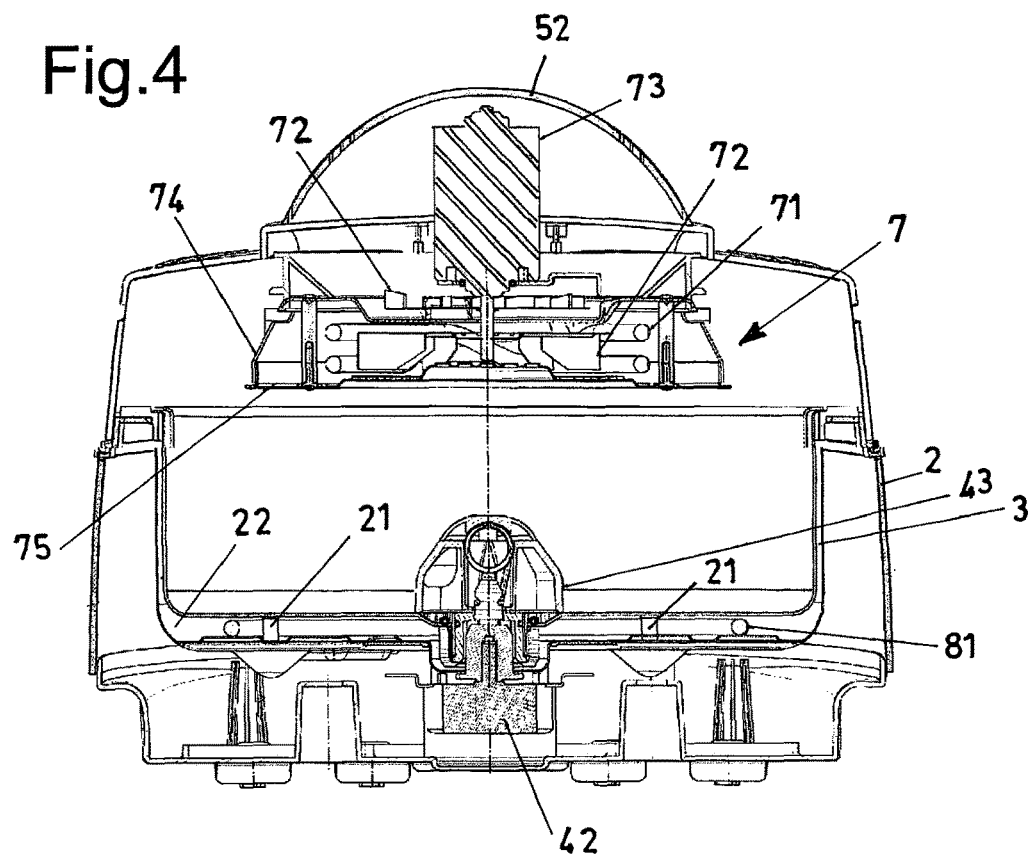
FIG. 4 a sectional view of the machine according to the present invention.

With reference to the aforementioned figures the cooking machine according to the present invention is a multifunction machine which can be used as a fryer, or as an oven for pastries, cakes, pizza and other similar food products. In addition, it can be used for cooking rice, souffles, sauces etc.

The machine substantially comprises an external casing 2 adapted to house a container 3 for food to be cooked in the machine. The container is preferably cylindrically shaped and it is housed in a housing of the casing of a substantially analogous shape. A plurality of protuberances 21, that project from the bottom of the casing, allows the resting of the container therein.

The casing 2 is closed by a lid 5 which covers the shape thereof on the perimeter and which is constrained thereto preferably through a spring mechanism, which maintains the lid in a normally open position. The closure of the same is ensured through a snap-mechanism 6 arranged on the front part of the casing on its upper edge. The release of the button 61 causes the opening of the lid.

The machine further comprises means 4 for mixing the food contained in the container substantially comprising a shaped paddle 41 actuated by a motor 42 and splined on the shaft of such motor through a pin 43. Such motor is arranged beneath the container 3 in a special housing and the shaft thereof enters into the container through a central hole 31 obtained on the bottom of the container.

The pin 43 can be released from the shaft and thus the paddle and the container 3 may be extracted from the casing.

Means 7, associated with such lid 5, are provided for generating a hot air flow in the direction of the food arranged in the container 3. Such means preferably comprise at least one upper heating element 71, usually comprising one or more spiral-shaped or ring-shaped electric resistors and at least one fan 72, adapted to generate a flow with air heated by said heating element. Such fan is moved through at least one motor 73.

In the illustrated embodiment, the motor 73 is positioned in a special housing of the lid with the drive shaft thereof arranged on a vertical axis Y; the fan, which is splined on such shaft, thus rotates around such axis. The heating element is arranged below the motor and substantially surrounds such fan.

According to a characteristic of the present invention outside the heating element and fan an air conveying duct 74 is present, which is adapted to direct the hot air flow in a direction substantially perpendicular to the plane on which the food lies in the container.

Such conveying duct is preferably bell-shaped; advantageously, it is enclosed in the lower part thereof by a protection grid 75.

Preferably, the generation means 7 are positioned in the lid, so as to correspond to a central area of the underlying container 3. Thus, the directed flow reaches the food in a substantially uniform manner.

According to a further characteristic of the present invention, the machine comprises at least one lower heating element 81 arranged beneath the container 3.

Such lower element is housed at the base of the casing in a hollow space 22 obtained between the container and the casing, due to the presence of the protuberances 21, fixing the container in a higher position with respect to the casing.

Such second heating element, when it comes to cooking some foods, such as for example rice or cakes or the like which require receiving heat from the bottom, cooperates with the upper heating element 71.

According to a further characteristic of the present invention the dimensions of the generation means in their entirety play an important role; actually, the diameter of the conveying duct 74 is only slightly smaller than the diameter of the container 3; in this manner, the distribution of the air flow on the food is uniform. Preferably, the diameter of the duct is lower than 70% the diameter of the container.

According to a further characteristic, the lid 5 is provided with air intakes 51 which put the container 3 in communication with the external environment. Thus, a circulation of air entering and exiting from the container (as indicated in FIG. 5 through the arrows F) in which the food is cooked is created, improving the fragrance and cooking characteristics of the foods in question.

Such air intakes are preferably positioned laterally with respect to a central dome 52 and possibly even on the dome of the lid beneath which the motor 73 which actuates the fan 72 is positioned.

The size of the conveyor conduit, as indicated above, is such to guarantee a free path for the air flow from and towards the air intakes 51, which for such purpose are preferably obtained in the lateral position of the lid indicated above with respect to the dome 52, right at such lower free space.

Advantageously, the lid 5 has at least one transparent portion so as to allow to see the food arranged inside the container.

SEQUENCE LISTING

Not applicable

The invention claimed is:

1. A cooking machine comprising an outer casing, which houses a container for a food to be cooked and a source of hot air that can be spread in the direction of said food, said casing being closed on the upper side by a lid,
   said lid is associated with a hot air flow generator constructed and arranged to move hot air in the direction of the food arranged in the container,
   said hot air flow generator comprises
      at least one upper heating element
      at least one fan, which is adapted to generate a flow with the air heated by said at least one upper heating element,
      an air conveying duct having duct wall having a duct diameter defined by an outer wall of the duct, the duct wall being provided outside of the at least one upper heating element, and the fan and being adapted to direct the hot air flow to the surface on which the food lies inside the container,
      wherein the lid has a lid diameter defined by an inner wall of the lid and is provided with air intakes, which establish a communication outside of the conveying duct between the inside of the container and the outside of the machine,
   characterized in that
   said air intakes are positioned between the inner wall of the lid and the outer wall of the duct, and
   the duct diameter is smaller than the lid diameter, thereby allowing a free path of air between the inner wall of the lid and the outer wall of the duct from the interior of the container to the air intakes in both directions with hot air coming out of the cooking machine and cool air coming into the cooking machine through the air intakes.

2. The cooking machine according to claim 1, wherein the hot air flow generator is arranged in the lid, so as to correspond to a central area of the container underneath.

3. The cooking machine according to claim 1 and comprising, furthermore, a lower heating element, which is arranged under the container.

4. The cooking machine according to claim 3, wherein said lower heating element is housed in a hollow space, which is obtained between the container itself and the casing.

5. The cooking machine according to claim 4, wherein the container lies on protuberances that project from the casing and fix the container itself in a higher position with respect to the casing.

6. The cooking machine according to claim 1, wherein said at least one upper heating element comprises one or more spiral-shaped or ring-shaped electric resistors, which surround the fan.

7. The cooking machine according to claim 1, wherein said fan is properly actuated so as to rotate around a vertical axis.

\* \* \* \* \*